(12) United States Patent
Wu et al.

(10) Patent No.: US 11,871,745 B2
(45) Date of Patent: Jan. 16, 2024

(54) BACTERIA REPELLANT POLYMER COMPOSITES

(71) Applicant: Ka Shui Plastic Technology Co. Ltd., Hong Kong (CN)

(72) Inventors: You Wu, Hong Kong (CN); Hoi-Kuan Kong, Hong Kong (CN); Yan-Hua Zhao, Hong Kong (CN); Ho-Man Au, Hong Kong (CN); Wai-Chung Peter Wong, Hong Kong (CN); Cheuk-Nang Daniel Sung, Hong Kong (CN); Yuen-Fat Lee, Hong Kong (CN)

(73) Assignee: Ka Shui Plastic Technology Co. Ltd., Hong Kong (CN)

( * ) Notice: Subject to any disclaimer, the term of this patent is extended or adjusted under 35 U.S.C. 154(b) by 257 days.

(21) Appl. No.: 17/194,442

(22) Filed: Mar. 8, 2021

(65) Prior Publication Data

US 2022/0279786 A1   Sep. 8, 2022

(51) Int. Cl.
| | | |
|---|---|---|
| *A01N 25/10* | (2006.01) | |
| *A01N 31/02* | (2006.01) | |
| *A01N 37/38* | (2006.01) | |
| *A01N 37/44* | (2006.01) | |
| *A01N 37/46* | (2006.01) | |
| *C08F 110/06* | (2006.01) | |
| *C08F 110/02* | (2006.01) | |
| *C08G 59/32* | (2006.01) | |
| *C08F 120/32* | (2006.01) | |

(52) U.S. Cl.
CPC ............ *A01N 37/46* (2013.01); *A01N 25/10* (2013.01); *A01N 31/02* (2013.01); *A01N 37/38* (2013.01); *A01N 37/44* (2013.01); *C08F 110/02* (2013.01); *C08F 110/06* (2013.01); *C08F 120/32* (2013.01); *C08G 59/3218* (2013.01)

(58) Field of Classification Search
CPC .......... C08L 15/00; C08L 23/26; C08L 23/36; C08L 27/22; C08L 53/008; C08L 53/025; C08L 61/14; C08L 61/32; C08L 67/08; C08L 71/126; C08L 2203/02; C08L 63/00; C08L 63/04; C08L 63/06; C08L 63/08; C08L 63/10; A01N 37/46; A01N 37/38; A01N 37/04; A01N 25/10
See application file for complete search history.

(56) References Cited

U.S. PATENT DOCUMENTS

| | | |
|---|---|---|
| 6,096,564 A | 8/2000 | Denes et al. |
| 8,927,616 B2 | 1/2015 | Thomas et al. |
| 9,498,934 B2 | 11/2016 | Paxson et al. |
| 9,683,197 B2 | 6/2017 | Aizenberg et al. |
| 10,030,108 B1 | 7/2018 | Lau et al. |
| 10,525,614 B2 | 1/2020 | Lau et al. |
| 2018/0208753 A1 | 7/2018 | Lau et al. |
| 2019/0263981 A1 | 8/2019 | Wu et al. |
| 2020/0017658 A1 | 1/2020 | Liu et al. |

FOREIGN PATENT DOCUMENTS

| | | |
|---|---|---|
| CA | 2234538 A1 | 10/1998 |
| CA | 2235090 A1 | 10/1998 |
| CA | 2241380 A1 | 12/1998 |
| CA | 2244049 A1 | 1/1999 |
| DE | 19700082 A1 | 7/1998 |
| DE | 19818958 A1 | 11/1999 |
| WO | 2000/044818 A1 | 8/2000 |
| WO | 2012/058605 A1 | 5/2012 |
| WO | 2013/003373 A1 | 1/2013 |
| WO | 2015/009257 A1 | 1/2015 |

*Primary Examiner* — Irina S Zemel
*Assistant Examiner* — Jeffrey S Lenihan
(74) *Attorney, Agent, or Firm* — S&F/WEHRW

(57) ABSTRACT

Bacteria repellant polymer composite having a reduced yellowness index prepared by melt processing a base polymer an epoxy resin and a bacteria repellant agent and methods of preparation thereof.

20 Claims, 1 Drawing Sheet

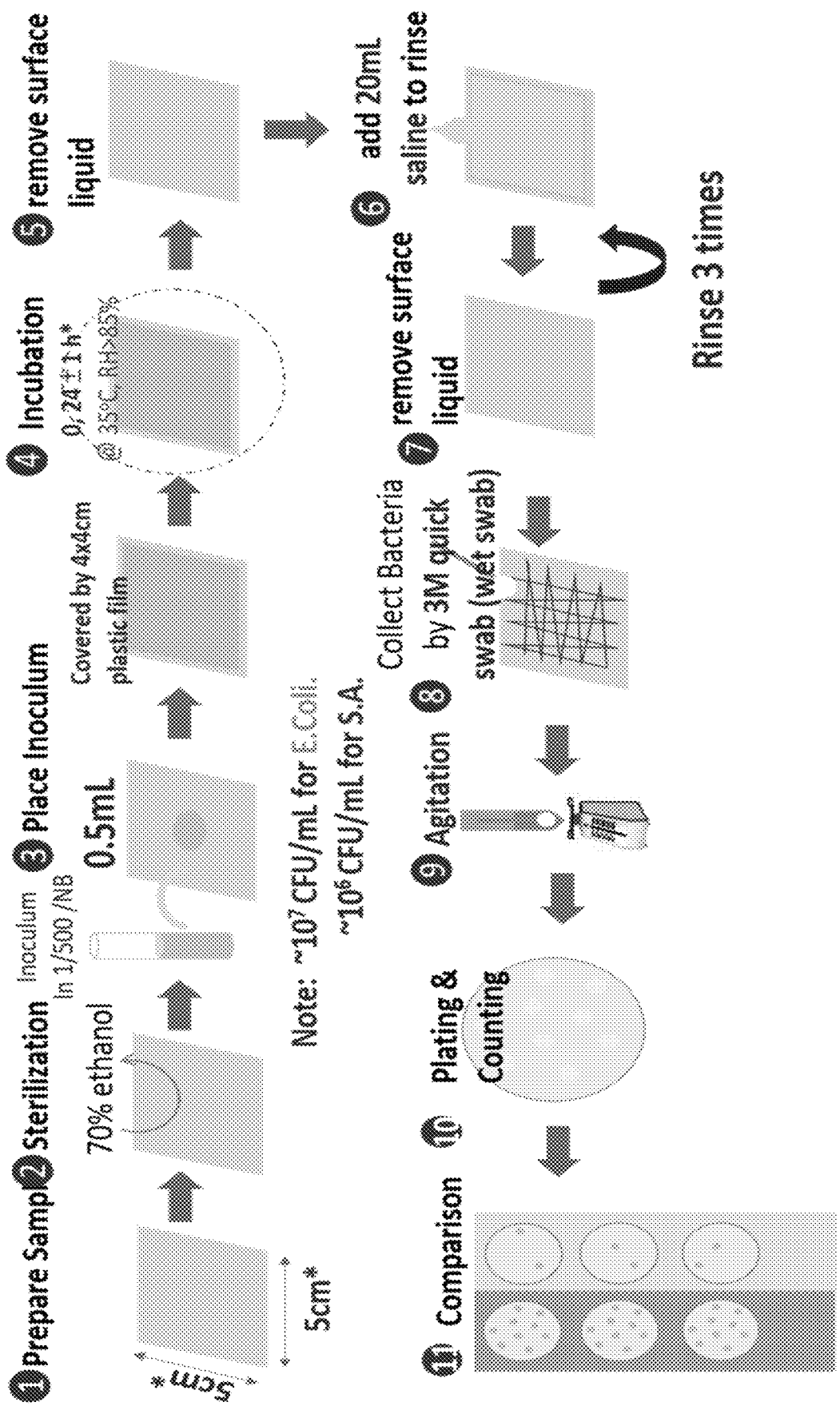

BACTERIA REPELLANT POLYMER COMPOSITES

TECHNICAL FIELD

The present disclosure relates to a method for the chemical modification of a polymer to improve the anti-biological adhesion of the polymer surface. More particularly, the present disclosure relates to a bacteria repellant polymer composites and methods of preparation and use thereof.

BACKGROUND

Various methods for conferring anti-fouling properties to polymers have been developed, such as by incorporation of silver, zinc, copper, and other antimicrobial agents. However, there's also raising concern regarding the safety of such antimicrobials. There is thus strong motivation for converting conventional anti-microbial agents to safe, non-leachable and non-fouling approach, which repel the attachment of bacteria instead of killing them. Polyethylene glycol and zwitterionic coatings have been shown to act as non-fouling modifiers when introduced in polymer composites due to their hydrophilicity and/or steric hindrance to proteins, bacteria and viruses.

Conventional non-fouling modification of polymers is usually achieved by surface modification and coating with hydrophilic layers on the polymeric surfaces after molding. However, such coating is not a cost effective and durable approach for preparing bacterial-repellant surface. In one approach for imparting bacteria repellency to a polymer, a masterbatch is prepared by pre-reaction of a maleic anhydride (MAH) based reactive linker with an anti-fouling agent, which is then grafted to a polyolefin to produce a masterbatch with bacteria-repellant properties. The masterbatch is then mixed with polymer by melt processing.

The use of MAH as a linker between the anti-fouling agent and the polyolefin has several limitations, such as increase of yellowness index (due to unsaturated nature of MAH) and the necessity of having complimentary reactive functionality in the non-fouling agent, such as hydroxyl or amine groups.

There is thus a need for improved methods for preparing bacteria repellant polymer composites and products thereof, which addresses or overcomes at least some of the challenges raised above.

SUMMARY

In view of the above, in a first aspect, provided herein is a bacteria repellant polymer composite comprising a base polymer and a bacteria repellant conjugate formed by the reaction of an epoxy resin and a bacteria repellant agent, wherein the bacteria repellant agent is a non-ionic surfactant or an ionic surfactant.

In certain embodiments, a 1 mm thick sample of the bacteria repellant polymer composite has a yellowness index of 3.5 or less according to ASTM E313.

In certain embodiments, the base polymer is selected from the group consisting of polyolefins, cyclic polyolefins, polyacrylics, polyacetates, polystyrenics, polyesters, polyimides, polyaryletherketones, polycarbonates, polyurethanes, polyacrylonitrile, polyvinylchlorides, polysulfone, polyamide, and thermoplastic elastomers, copolymers thereof, and blends thereof.

In certain embodiments, the base polymer is polypropylene, polyethylene, thermoplastic polyurethane, thermoplastic vulcanizate, styrene ethylene butylene styrene block thermoplastic elastomer, polycarbonate, and acrylonitrile butadiene styrene.

In certain embodiments, the bacteria repellant agent is selected from the group consisting of fatty alcohol polyoxyalkylene ethers, polyoxyalkylene fatty acid esters, polyoxyalkylene sorbitan fatty acid esters, sorbitol fatty acid esters, polyether glycols, polyoxyethylene sorbitol hexaoleate, polyoxyethylene sorbitan monolaurate, polyoxyethylene sorbitan monooleate, polyoxyethylene hydrogenated castor oil polyoxyethylene cetyl ether, polyoxyethylene stearyl ether, cocamidopropyl betaine, sodium hydrogen N-(1-oxododecyl)-L-glutamate, sodium lauroyl sarcosinate, sodium stearoyl glutamate, and 3-[(3-cholamidopropyl)dimethylammonio]-1-propanesulfonate.

In certain embodiments, the bacteria repellant agent is a polyethylene glycol ether of cetearyl alcohol, poly(ethylene glycol) sorbitol hexaoleate, cocamidopropyl betaine, N-(1-oxododecyl)-glutamate, sodium lauroyl sarcosinate, or a mixture thereof.

In certain embodiments, the epoxy resin is a novolac epoxy resin, poly(glycidyl methacrylate), and poly(glycidyl acrylate), a terpolymer of ethylene, methyl methacrylate and glycidyl methacrylate, a terpolymer of ethylene, acrylic ester, glycidyl methacrylate, epoxy functionalized polybutadiene, or epoxy functionalized poly(butadiene-co-polystyrene); or the epoxy resin is selected from the group consisting of:

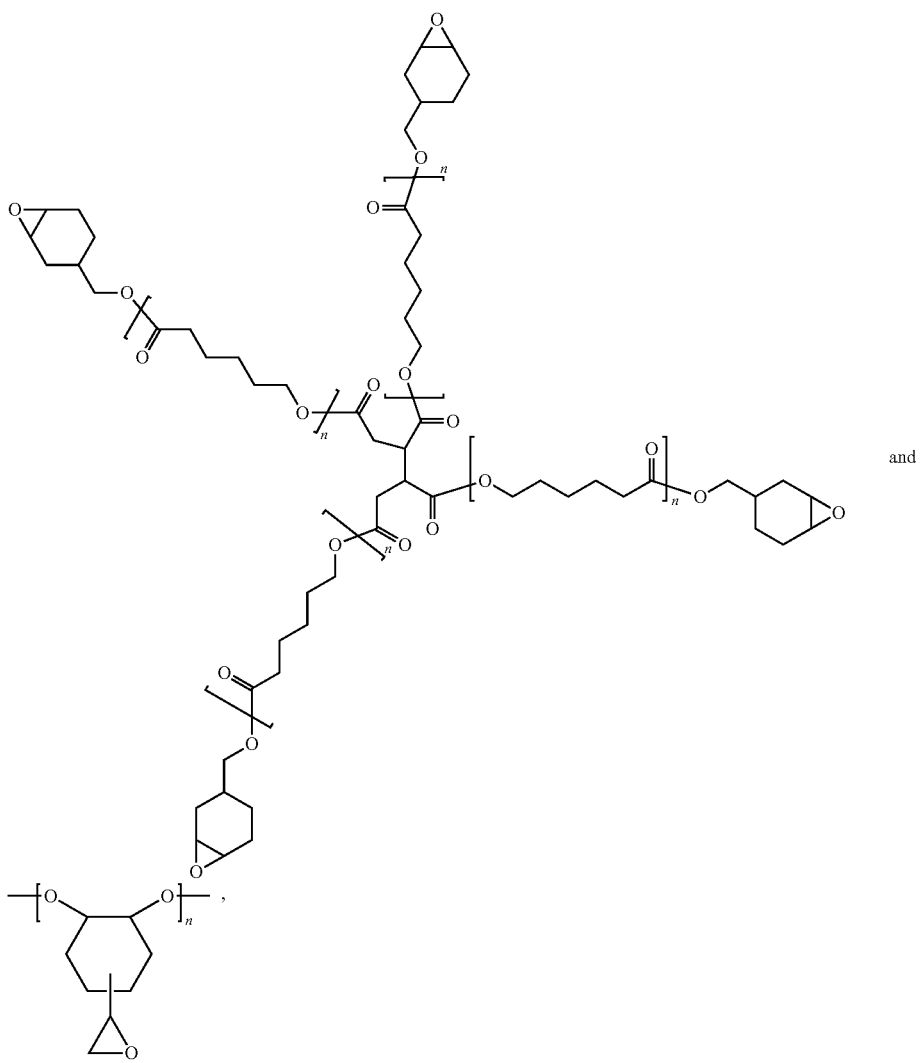

wherein n for each instance is independently 1-10,000.

In certain embodiments, the epoxy resin is a novolac epoxy resin, poly(glycidyl methacrylate), a terpolymer of ethylene, acrylic ester, glycidyl methacrylate, epoxy functionalized polybutadiene, or epoxy functionalized poly(butadiene-co-polystyrene).

In certain embodiments, the bacteria repellant agent is a polyethylene glycol ether of cetearyl alcohol, poly(ethylene glycol) sorbitol hexaoleate, cocamidopropyl betaine, N-(1-oxododecyl)-glutamate, sodium lauroyl sarcosinate or a mixture thereof; and the epoxy resin is a novolac epoxy resin, poly(glycidyl methacrylate), a terpolymer of ethylene, acrylic ester, glycidyl methacrylate, epoxy functionalized polybutadiene, or an epoxy functionalized poly(butadiene-co-polystyrene).

In certain embodiments, a 1 mm thick sample of the bacteria repellant polymer composite has a yellowness index of 2.1 or less according to ASTM E313.

In certain embodiments, the base polymer and the bacteria repellant conjugate are present in the bacteria repellant polymer composite in a mass ratio of 92:8 to 98:2, respectively.

In certain embodiments, the based polymer is selected from the group consisting of polypropylene, polyethylene, thermoplastic polyurethane, thermoplastic vulcanizate, styrene ethylene butylene styrene block thermoplastic elastomer, polycarbonate, and acrylonitrile butadiene styrene; the bacteria repellant agent is a polyethylene glycol ether of cetearyl alcohol, poly(ethylene glycol) sorbitol hexaoleate, cocamidopropyl betaine, N-(1-oxododecyl)-glutamate, sodium lauroyl sarcosinate or a mixture thereof; the epoxy resin is a novolac epoxy resin, poly(glycidyl methacrylate), a terpolymer of ethylene, acrylic ester, glycidyl methacrylate, epoxy functionalized polybutadiene, or an epoxy functionalized poly(butadiene-co-polystyrene); and a 1 mm thick sample of the bacteria repellant polymer composite has a yellowness index between 1.1 to 2.1 according to ASTM E313.

In a second aspect, provided herein is a method of preparing a bacteria repellant polymer composite described herein, the method comprising: combining a base polymer, an epoxy resin, and a bacteria repellant agent thereby forming a mixture; and melt processing the mixture under conditions that facilitate the reaction of at least a portion of the epoxy resin and at least a portion of the bacteria repellant agent thereby forming the bacteria repellant polymer composite.

In certain embodiments, the base polymer is polypropylene, polyethylene, thermoplastic polyurethane, thermoplastic vulcanizate, styrene ethylene butylene styrene block thermoplastic elastomer, polycarbonate, and acrylonitrile butadiene styrene.

In certain embodiments, the bacteria repellant agent is a polyethylene glycol ether of cetearyl alcohol, poly(ethylene glycol) sorbitol hexaoleate, cocamidopropyl betaine, N-(1-oxododecyl)-glutamate, sodium lauroyl sarcosinate, or a mixture thereof.

In certain embodiments, the epoxy resin is a novolac epoxy resin, poly(glycidyl methacrylate), a terpolymer of ethylene, acrylic ester, glycidyl methacrylate, epoxy functionalized polybutadiene, or epoxy functionalized poly(butadiene-co-polystyrene).

In certain embodiments, the base polymer, the epoxy resin, and the bacteria repellant agent are combined in a mass ratio between 91:3:6 to 98:0.1:1.9, respectively.

In certain embodiments, the mixture is melt processed at a temperature between 180° C. to 270° C.

In certain embodiments, the based polymer is selected from the group consisting of polypropylene, polyethylene, thermoplastic polyurethane, thermoplastic vulcanizate, styrene ethylene butylene styrene block thermoplastic elastomer, polycarbonate, and acrylonitrile butadiene styrene; the bacteria repellant agent is a polyethylene glycol ether of cetearyl alcohol, poly(ethylene glycol) sorbitol hexaoleate, cocamidopropyl betaine, N-(1-oxododecyl)-glutamate, sodium lauroyl sarcosinate or a mixture thereof; the epoxy resin is a novolac epoxy resin, poly(glycidyl methacrylate), a terpolymer of ethylene, acrylic ester, glycidyl methacrylate, epoxy functionalized polybutadiene, or an epoxy functionalized poly(butadiene-co-polystyrene); the mixture is melt processed at a temperature between 190° C. to 270° C.; and the base polymer, the epoxy resin, and the bacteria repellant agent are combined in a mass ratio between 93:2:5 to 96.8:0.2:3, respectively.

In a third aspect, provided herein is a bacteria repellant composite prepared in accordance with a method described herein.

The present disclosure also provides a method of modifying a polymer with a bacterial-repellant (non-fouling) moiety onto an intermediate comprising an epoxy group by melt mixing. Unlike conventional built-in bacterial-repellant polymers comprising a MAH based linker, the current disclosure utilizes an epoxy based linker. The bacterial-repellant polymer prepared with epoxy based linkers advantageously exhibit a lower yellowness index compared than those with MAH based linkers.

Unlike bacteria repellant polymer composites, which use MAH to conjugate the bacteria repellant agent to the polymer, the present bacteria repellant polymer composites are prepared using epoxide based functional groups, which advantageously result in bacteria repellant polymer composites with lower yellowness. Moreover, epoxides are capable of reacting with a broader range of functional groups, such as hydroxyl, amine, carboxy, and carbonate groups, which are typical functional groups found in organic non-ionic and ionic surfactants.

By the methods described herein, the hardness, density, and mechanical properties of repellant polymer composites are well maintained while still conforming to various standards for different applications including those plastics, which are safe for food and beverages because the modifiers and other main components added into the composition for modifying the base polymer according to the present disclosure enable biofouling resistance of the end product or molded article reformed therefrom against fluid biological matters, such as microbes, mammalian cells, proteins, peptides, nucleic acids, steroids and other cellular constituents. Therefore, the final product or molded article derived from molding the final product conforms to relevant standards for food and beverage safety plastics.

BRIEF DESCRIPTION OF THE DRAWINGS

The appended drawings, where like reference numerals refer to identical or functionally similar elements, contain figures of certain embodiments to further illustrate and clarify the above and other aspects, advantages and features of the present disclosure. It will be appreciated that these drawings depict exemplary embodiments and as such are not intended to limit the scope of the present disclosure. The present disclosure will be described and explained with additional specificity and detail through the use of the accompanying drawings.

The FIGURE is a schematic diagram of the process of microbial adsorption test on samples. The process is based on the revised ASTM WK66122 standard.

DETAILED DESCRIPTION

References in the specification to "one embodiment", "an embodiment", "an example embodiment", etc., indicate that the embodiment described can include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a concentration range of "about 0.1% to about 5%" should be interpreted to include not only the explicitly recited concentration of about 0.1 wt. % to about 5 wt. %, but also the individual concentrations (e.g., 1%, 2%, 3%, and 4%) and the sub-ranges (e.g., 0.1% to 0.5%, 1.1% to 2.2%, and 3.3% to 4.4%) within the indicated range.

As described herein, the term "a" or "an" is used to include one or more than one and the term "or" is used to refer to a nonexclusive "or" unless otherwise indicated. In addition, it is to be understood that the phraseology or terminology employed herein, without being otherwise defined, is for the purpose of description only and not of limitation. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference should be considered supplementary to that of this document; for irreconcilable inconsistencies, the usage in this document controls.

As used herein, "alkyl" refers to a straight-chain or branched saturated hydrocarbon group. Examples of alkyl groups include methyl-, ethyl-, propyl (e.g., n-propyl and isopropyl), butyl (e.g., n-butyl, iso-butyl, sec-butyl, tert-butyl), pentyl groups (e.g., 1-methylbutyl, 2-methylbutyl, iso-pentyl, tert-pentyl, 1,2-dimethylpropyl, neopentyl, and 1-ethylpropyl), hexyl groups, and the like. In various embodiments, an alkyl group can have 1 to 40 carbon atoms (i.e., C1-40 alkyl group), for example, 1-30 carbon atoms (i.e., C1-30 alkyl group). In certain embodiments, an alkyl group can have 1 to 6 carbon atoms, and can be referred to as a "lower alkyl group." Examples of lower alkyl groups include methyl, ethyl, propyl (e.g., n-propyl and isopropyl), and butyl groups (e.g., n-butyl, isobutyl, sec-butyl, tert-butyl). In certain embodiments, alkyl groups can be optionally substituted as described herein. An alkyl group is generally not substituted with another alkyl group, an alkenyl group, or an alkynyl group.

As used herein, a "polymeric compound" (or "polymer") refers to a molecule including a plurality of one or more repeating units connected by covalent chemical bonds. A polymeric compound can be represented by General Formula I:

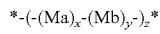  General Formula I wherein each Ma and Mb is a repeating unit or monomer. The polymeric compound can have only one type of repeating unit as well as two or more types of different repeating units. When a polymeric compound has only one type of repeating unit, it can be referred to as a homopolymer. When a polymeric compound has two or more types of different repeating units, the term "copolymer" or "copolymeric compound" can be used instead. For example, a copolymeric compound can include repeating units where Ma and Mb represent two different repeating units. Unless specified otherwise, the assembly of the repeating units in the copolymer can be head-to-tail, head-to-head, or tail-to-tail. In addition, unless specified otherwise, the copolymer can be a random copolymer, an alternating copolymer, or a block copolymer. For example, General Formula I can be used to represent a copolymer of Ma and Mb having x mole fraction of Ma and y mole fraction of Mb in the copolymer, where the manner in which comonomers Ma and Mb is repeated can be alternating, random, regiorandom, regioregular, or in blocks, with up to z comonomers present. In addition to its composition, a polymeric compound can be further characterized by its degree of polymerization (n) and molar mass (e.g., number average molecular weight (M) and/or weight average molecular weight (Mw) depending on the measuring technique(s)). The polymers described herein can exist in numerous stereochemical configurations, such as isotactic, syndiotactic, atactic, or a combination thereof.

In the methods of manufacturing described herein, the steps can be carried out in any order without departing from the principles of the invention, except when a temporal or operational sequence is explicitly recited. Recitation in a claim to the effect that first a step is performed, and then several other steps are subsequently performed, shall be taken to mean that the first step is performed before any of the other steps, but the other steps can be performed in any suitable sequence, unless a sequence is further recited within the other steps. For example, claim elements that recite "Step A, Step B, Step C, Step D, and Step E" shall be construed to mean step A is carried out first, step E is carried out last, and steps B, C, and D can be carried out in any sequence between steps A and E, and that the sequence still falls within the literal scope of the claimed process. A given step or sub-set of steps can also be repeated.

Furthermore, specified steps can be carried out concurrently unless explicit claim language recites that they be carried out separately. For example, a claimed step of doing X and a claimed step of doing Y can be conducted simultaneously within a single operation, and the resulting process will fall within the literal scope of the claimed process.

Provided herein is a bacteria repellant polymer composite comprising a base polymer and a bacteria repellant conjugate formed by the reaction of an epoxy resin and a bacteria repellant agent, wherein the bacteria repellant agent is a non-ionic surfactant or an ionic surfactant.

The bacteria repellant polymer composites described herein can exhibit 99% or higher bacteria repellence and a yellowness index. Without wishing to be bound by theory, it is believed that the surprisingly reduced yellowness index of the polymer composites described herein is the result of the use of an epoxide reaction linker, proper selection of the bacteria repellant agent and epoxy resin, and the proper selection of the stoichiometry of the base polymer and bacteria repellant conjugate. In certain embodiments, a 1 mm thick sample of the bacteria repellant polymer composite described herein has a yellowness index of about 5 or less, about 4 or less, about 3 or less, about 2.5 or less, about 2 or less, about 1.75 or less, or about 1.5 or less according to ASTM E313. In certain embodiments, a 1 mm thick sample of the bacteria repellant polymer composite described herein has a yellowness index of about 1 to 3.5, about 1 to 3.0, about 1.1 to 2.5, about 1.1 to 2.0, about 1.1 to 1.9, about 1.1 to 1.7, about 1.1 to 1.6, or about 1.1 to 1.5 according to ASTM E313.

The bacteria repellant polymer composites may comprise homopolymers, copolymers and blends of polyolefins, cyclic polyolefins, acrylics, acetates, styrenics, polyesters, polyimides, polyaryletherketones, polycarbonates, polyurethanes and thermoplastic elastomers. In a preferred embodiment, the polymer being modified by the present method includes but not limited to thermoplastic polyurethane, thermoplastic vulcanizate, styrene ethylene butylene styrene block thermoplastic elastomer, polypropylene and polyolefin elastomers, etc. The thermoplastics in the present disclosure may also comprise poly(methyl methacrylate), polystyrene, polyethylene terephthalate, polycarbonate, polymethylpentene, polysulfone, polyamide, polyvinyl chloride, styrene acrylonitrile, styrene-methacrylate based copolymer, polypropylene based copolymer, acrylonitrile butadiene styrene, polyimide, cellulosic resins, methyl methacrylate butadiene styrene, or copolymers thereof, or blends thereof.

In certain embodiments, the base polymer is polypropylene, polyethylene, thermoplastic polyurethane, thermoplastic vulcanizate, styrene ethylene butylene styrene block thermoplastic elastomer, polycarbonate, acrylonitrile butadiene styrene, or copolymers thereof, or blends thereof.

In certain embodiments, the bacteria repellant agent comprises one or more non-ionic surfactants selected from the group consisting of fatty alcohol polyoxyalkylene ethers, polyoxyalkylene fatty acid esters, polyoxyalkylene sorbitan/sorbitol fatty acid esters, polyether glycols and their derivatives. In a preferred embodiment, the non-ionic surfactants comprise one or more of polyoxyethylene sorbitol hexaoleate, polyoxyethylene sorbitan monolaurate, polyoxyethylene hydrogenated castor oil and polyoxyethylene cetyl/stearyl ether. The non-ionic surfactants may also comprise one or more of polyoxyethylene acrylate, polyoxyethylene methacrylate, polyoxyethylene vinyl ethers. The non-ionic surfactants may also comprise one or more of polyoxypropylene glycol, polyoxypropylene amine and polyoxypropylene acrylate, polyoxypropylene methacrylate, polyoxypropylene glycerol ether, and their derivatives.

In certain embodiments, non-ionic surfactant can comprise one or more polyoxyethylene or polyoxypropylene moieties having a molecular weight ranging from 132 Da to 4,400 Da. In certain embodiments, the polyoxyethylene in PEG sorbitol hexaoleate has a molecular weight ranging from 132 to 4,400 Da.

In certain embodiments, the bacteria repellant agent comprises one or more ionic surfactants selected from the group consisting of cocamidopropyl betaine, sodium hydrogen N-(1-oxododecyl)-L-glutamate, sodium lauroyl sarcosinate, sodium stearoyl glutamate, and 3-[(3-cholamidopropyl)dimethylammonio]-1-propanesulfonate.

In certain embodiments, the bacteria repellant agent is a polyethylene glycol ether of cetearyl alcohol, poly(ethylene glycol) sorbitol hexaoleate, cocamidopropyl betaine, N-(1-oxododecyl)-glutamate, sodium lauroyl sarcosinate, or a mixture thereof.

In certain embodiments, the epoxy resin is a novolac epoxy resin, poly(glycidyl methacrylate), and poly(glycidyl acrylate), a terpolymer of ethylene, methyl methacrylate and glycidyl methacrylate, a terpolymer of ethylene, acrylic ester, glycidyl methacrylate, epoxy functionalized polybutadiene, or epoxy functionalized poly(butadiene-co-polystyrene); or the epoxy resin is selected from the group consisting of:

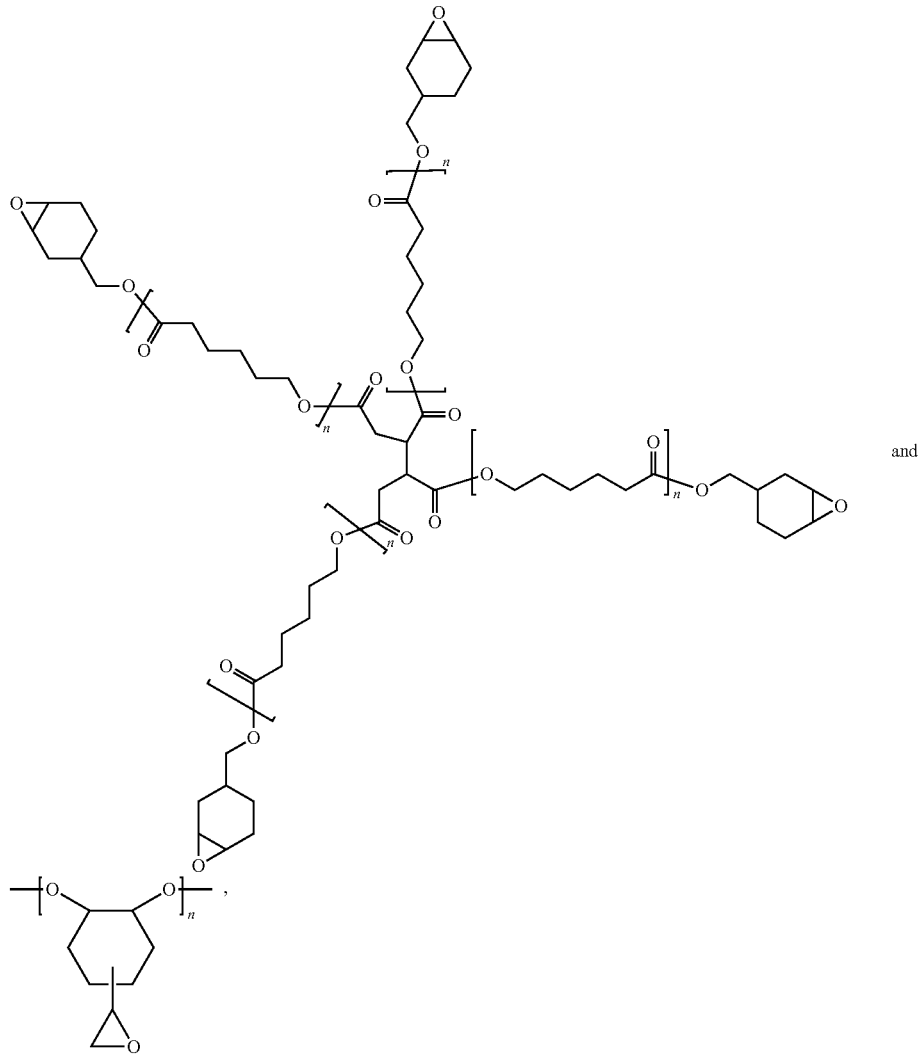

and wherein n for each instance is independently 1-10,000, 1-1,000, 1-500, 1-100, 1-50, 1-40, 1-30, or 5-20.

In certain embodiments, the epoxy resin is a novolac epoxy resin, poly(glycidyl methacrylate), a terpolymer of ethylene, acrylic ester, glycidyl methacrylate, epoxy functionalized polybutadiene, or epoxy functionalized poly(butadiene-co-polystyrene), e.g., sold under the trademark EPOFRIEND™ CT310 by Daicel Corporation®. In certain embodiments, the epoxy resin is a terpolymer of ethylene, acrylic ester and glycidyl methacrylate sold under the trademark Lotader® AX8900 by Palmer Holland, a terpolymer of ethylene, methyl methacrylate and glycidyl methacrylate, epsilon-caprolactone modified tetra(3,4-epoxycyclohexylmethyl)butanetetracarboxylate, e.g., sold under the trademark Epolead™ GT401 by Daicel Corporation®, or poly(glycidyl methacrylate)). In certain embodiments, the epoxy resin is epsilon-caprolactone modified tetra(3,4-epoxycyclohexylmethyl)butanetetracarboxylate having an average molecular weight of about 789 g/mol (epoxy equivalent of 220 g/eq.) or epoxy functionalized poly(butadiene-co-polystyrene) having an epoxy equivalent of 2125 g/eq.

The mass ratio and the selection of the functional modifiers (e.g., the bacteria repellant agent and the epoxy resin) can be critical to the bacteria repellant performance, retention of physical properties of the base polymer, and achieving a low yellowness index. The mass ratio the bacteria repellant conjugate to the base polymer can be between about 0.1:99.9 to 1:9. In certain embodiments, the mass ratio of the bacteria repellant conjugate and the base polymer is between about 0.1:99.9 to 9:91, about 0.1:99.9 to 8:92, about 0.5:99.5 to 8:92, about 1:99 to 8:92, about 2:98 to 8:92, about 3:97 to 8:92, about 4:96 to 8:92, about 5:95 to 8:92, about 6:94 to 8:92, about 1:99 to 5:95, about 2:98 to 5:95, about 2.5:97.5 to 5:95, about 2.5:97.5 to 4.5:95.4, about 3:97 to 4:96, or about 3.2:96.8 to 4:96, respectively.

The weight percentage bacteria repellant conjugate in the bacteria repellant polymer composite can be about 10% or less, about 9% or less, about 8% or less, about 7% or less, about 6% or less, about 5% or less, about 4% or less, about 3.2% or less, or about 3% or less relative to the weight of the bacteria repellant conjugate and the base polymer.

Other additives, such as anti-oxidant, optical brightener, color masterbatch, nucleating agents, mold release agents, color stabilizers, UV stabilizers, fillers, plasticizers, impact modifiers, colorants, lubricants, antistatic agents, fire retardants, anti-ester exchange agents, whitening agent and the like are chosen to control the appearance and scent of the articles.

The anti-oxidant can be selected from butylated hydroxytoluene, IRGANOX® 1010, IRGANOX® 1076, IRGANOX® 1098, IRGAFOS® 168 or IRGANOX® B 225. The anti-oxidant can be present at a weight percentage of 0.1 to 1 wt % of the total weight of the composition.

The brightener can be selected HOSTALUX® KS, HOSTALUX® KS 1, KEYFLUOR® WHITE OB, KEYFLUOR® WHITE OB-1, and KEYFLUOR® WHITE RWP. The brightener can be present at a weight percentage of 0.01 to 0.05 wt % of the total weight of the composition.

The whitening agent can comprises one or more of Keystone® OB and Keystone® OB-1. More specifically, the nucleating agent comprises one or more of MILLAD® NX8000, MILLAD® 3988, ADK STAB NA-18, or ADK STAB NA-25.

The anti-transesterification agent can comprise one or more of sodium phosphate monobasic or triphenyl phosphite.

The present disclosure also provides a method of preparing the bacteria repellant polymer composite described herein, the method comprising: combining a base polymer, an epoxy resin, and a bacteria repellant agent thereby forming a mixture; and melt processing the mixture under conditions that facilitate the reaction of at least a portion of the epoxy resin and at least a portion of the bacteria repellant agent thereby forming the bacteria repellant polymer composite.

The base polymer, the epoxy resin, and the bacteria repellant agent can be combined in a mass ratio between about 91:3:6 to 98:0.1:1.9, about 92:3:5 to 98:0.1:1.9, about 93:3:4 to 98:0.1:1.9, about 94:3:3 to 98:0.1:1.9, about 94:3:3 to 97.9:0.2:1.9, about 94:3:3 to 97.1:1:1.9, about 94:3:3 to 96.1:2:1.9, or about 93:2:5 to 94:1:5, respectively.

In alternative embodiments, the method of preparing the bacteria repellant polymer composite described herein, comprises: providing a bacteria repellant conjugate prepared by the reaction of a bacteria repellant agent and an epoxy resin, wherein the bacteria repellant agent is selected from the group consisting of a non-ionic surfactant and an ionic surfactant; combining a base polymer and the bacteria repellant conjugate thereby forming a mixture and melt processing the mixture thereby forming the bacteria repellant polymer composite.

In instances in which the bacteria repellant conjugate is prepared beforehand, the base polymer and the bacteria repellant conjugate can be combined in a mass ratio between about 0.1:99.9 to 9:91, about 0.1:99.9 to 8:92, about 0.5:99.5 to 8:92, about 1:99 to 8:92, about 2:98 to 8:92, about 3:97 to 8:92, about 4:96 to 8:92, about 5:95 to 8:92, about 6:94 to 8:92, about 1:99 to 5:95, about 2:98 to 5:95, about 2.5:97.5 to 5:95, about 2.5:97.5 to 4.5:95.4, about 3:97 to 4:96, or about 3.2:96.8 to 4:96, respectively.

The formation of the bacteria repellant conjugate can result from the reaction of at least a portion of the epoxides present in the epoxy resin with one or more nucleophiles present in the bacteria repellant agent (e.g., a hydroxyl, amine, carboxylic acid, or the like). The formation of the bacteria repellant conjugate may be conducted prior to mixing with the base polymer or formed in situ during the melt blending step of the base polymer, epoxy resin, and the bacteria repellant agent.

Melt processing can be achieved on either a mixer or a single/twin-screw extruder operated within a proper processing temperature range according to different melting temperatures of the base thermoplastics and other main components for modifying the same, e.g. from 80 to 270° C. The melt mixing duration can range from 60 s to 600 s. The selection of the appropriate melt processing conditions is well within the skill of a person of ordinary skill in the art.

In certain embodiments, the melt processing step is accomplished using one or more of an extruder, e.g., single and twin screw extruders, Banburry mixer, or a melt blending step.

After melt processing, the resulting bacteria repellant polymer composite can then be optionally palletized. The thus obtained bacteria repellant polymer composite can then be subjected to injection molding directly to reform into an article with a desired shape and dimension. Apart from injection molding, other molding methods, such as profile extrusion, blow molding, blow filming, film casting, spinning and over-molding of the bacteria repellant polymer composite on a plastic substrate can also be applied to reform into an article. The bacteria repellant polymer composite can be molded into a shape such as a pellet, but also semi-finished product or an article.

The bacteria repellant polymer composite described herein can be used in the preparation of plastic articles with germ-repellant function. The invention is also directed to the use of the bacteria repellant polymer composite for the preparation of an article. The article can be an article for the storage or transport of food or beverages.

In certain embodiments, the article is a pipe for the transport of a fluid. The fluid can be a beverage, for example water and for example a soft drink, wine, beer or milk.

In certain embodiments, the article is a flexible packaging. Suitable examples are films, sheets, plastic bags, containers, bottles, boxes and buckets. In certain embodiments, the bacteria repellant polymer composite is used for pharmaceutical packaging, such as for example in primary packaging that is in direct contact with the active pharmaceutical ingredient and includes blister packs, fluid bags, pouches, bottles, vials and ampoules.

In certain embodiments, the article is used in medical applications. Medical applications include for example closures, rigid bottles and ampoules, needle sheaths, plunger rods for single-use syringes, moldings to house diagnostic equipment, collapsible tube shoulders, blow-fill-seal products, collapsible tube bodies, film for primary and secondary medical and pharmaceutical packaging, disposable syringes, actuator bodies, specimen cups, moldings to house diagnostic equipment, centrifuge tubes, multi-well micro-titration plates, trays, pipettes and caps and closures.

The protocol for germ repellant tests on the molded circular plate samples of the bacteria repellant polymer composites described herein is illustrated in the schematic diagram in the FIGURE. The protocol is based on ASTM WK66122 standard. The starting inoculum concentration of E. coli (ATCC® 8739™) and S. aureus (ATCC® 6538P™) was about $8\times10^8$ and $8\times10^7$ cells/ml in 1/500 NB solution (1/500 NB refers to the 500× diluted Nutrient Broth with pH adjusted to 6.8-7.2) for challenging the sample surface. Result of the adsorption tests are illustrated in the following examples.

The germ-repellant properties and yellowness index of various polymer composites prepared from an epoxy resin and a non-ionic surfactant bacteria repellant agent are summarized in Table 1 below. For a typical formulation, it is composed of certain ratio (by weight) of base polymer, reactive linker and non-fouling agent to form a mixed composition. The composition was melting blended via a twin-screw extruder to enable the reaction between linker and non-fouling agents. The typical processing temperature is 200° C., with a L/D ratio of the screw is at least 41, while for PC and Tritan, the processing temperature is increased to 270° C. The composition after melt processing is then pelletized into granule shape, and then molded into a standard specimen (L×W×D=50 mm×50 mm×1 mm) for further testing. The aging of samples was performed by immersing the samples into a PP based container filled with water at 80% capacity. The sample with container was then put into a microwave oven under 1,000 W for 3 mins, 10 cycles. The samples are then tested for germ-repellant test according to the FIGURE.

TABLE 1

Bacteria repellant polymer composites prepared from non-ionic surfactant bacteria repellant agents.

| | Base Polymer | Epoxy Resin | Bacteria Repellant Agent | Processing Condition | Yellowness Index (ASTM E313) | Germ-Repellant Rate after aging |
|---|---|---|---|---|---|---|
| 1a | 96.8% polypropylene (Clyrell ® RC5056) | 0.2% Poly(Glycidyl methacrylate) (Sigma-Aldrich ®) | 3% Ceteareth-20 (BASF ® Eumulgin B2) | Barrel Temp: 200° C. L/D ratio: 41 Screw Diameter: 35 mm Screw Speed: 150 rpm | 2.1 | 99% |
| 2a | 96% high density polyehtylene (Exxonmobil HMA-016) | 2% terpolymer of ethylene, acrylic ester and glycidyl methacrylate (Lotader AX8900) | 2% Ceteareth-20 (BASF ® Eumulgin B2) | Barrel Temp: 190° C. L/D ratio: 41 Screw Diameter: 35 mm Screw Speed: 150 rpm | 1.1 | 99% |
| 3a | 97% thermoplastic polyurethane (Covestro ® RxT85) | 1% terpolymer of ethylene, methyl methacrylate and glycidyl methacrylate (Ter-CE37B) | 2% Ceteareth-20 (BASF ® Eumulgin B2) | Barrel Temp: 200° C. L/D ratio: 41 Screw Diameter: 35 mm Screw Speed: 150 rpm | 1.5 | 99% |
| 4a | 94% ABS (Chimei ® PA-757) | 1% terpolymer of ethylene, methyl methacrylate and glycidyl methacrylate (Ter-CE37B) | 5% PEG-SHO (Croda Atlas ® G-1096) | Barrel Temp: 200° C. L/D ratio: 41 Screw Diameter: 35 mm Screw Speed: 150 rpm | 10 | 90% |
| 5a | 97% SEBS (ELASTRON ® F.G100.A60.N) | 1% terpolymer of ethylene, methyl methacrylate and glycidyl methacrylate (Ter-CE37B) | 2% Ceteareth-20 (BASF ® Eumulgin B2) | Barrel Temp: 200° C. L/D ratio: 41 Screw Diameter: 35 mm Screw Speed: 150 rpm | 3.5 | 98% |
| 6a | 96% TPV (Exxonmobil ® Santoprene 8271-55) | 2% terpolymer of ethylene, acrylic ester and glycidyl methacrylate (Lotader AX8900) | 2% Ceteareth-20 (BASF ® Eumulgin B2) | Barrel Temp: 200° C. L/D ratio: 41 Screw Diameter: 35 mm Screw Speed: 150 rpm | 6 | 98% |
| 7a | 93% PC (Covestro Makrolon ® 2407) | 2% terpolymer of ethylene, methyl methacrylate and glycidyl methacrylate (Ter-CE37B) | 5% PEG-40 hydrogenated castor oil (BASF ® Eumulgin CO-40) | Barrel Temp: 270° C. L/D ratio: 41 Screw Diameter: 35 mm Screw Speed: 150 rpm | 1.6 | 80% |

The germ-repellant properties and yellowness index of various polymer composites prepared from an epoxy resin and an ionic surfactant bacteria repellant agent are summarized in Table 2 below. For a typical formulation, it is composed of certain ratio (by weight) of base polymer, reactive linker and non-fouling agent to form a mixed composition. The composition was melt blended via a twin-screw extruder to enable the reaction between linker and non-fouling agents. The typical processing temperature is 200° C., with a L/D ratio of the screw is at least 41, while for PC and Tritan, due to the thermal stability of the zwitterionic based non-fouling agents, the processing temperature is set to 260° C. The composition after melt processing is then pelletized into granule shape, and then molded into a standard specimen (L×W×D=50 mm×50 mm×1 mm) for further testing. The aging of samples was performed with in-house method, the sample was immersed into a PP based container filled with water of 80% capacity. The sample with container was then put into a microwave oven under 1000 W for 3 mins, 10 cycles. The samples are then tested for germ-repellant test according to the FIGURE.

TABLE 2

Bacteria repellant polymer composites prepared from ionic surfactant bacteria repellant agents.

|  | Base Polymer | Epoxy Resin | Bacteria Repellant Agent | Processing Condition | Yellowness Index (ASTM E313) | Germ-Repellant Rate after aging |
|---|---|---|---|---|---|---|
| 8a | 94% ABS (Chimei ® PA-757) | 1% terpolymer of ethylene, methyl methacrylate and glycidyl methacrylate (Ter-CE37B) | 5% Cocamidopropyl betaine | Barrel Temp: 200° C. L/D ratio: 41 Screw Diameter: 35 mm Screw Speed: 150 rpm | 10 | 99% |
| 9a | 93% PC (Covestro ® PC 2407) | 2% terpolymer of ethylene, methyl methacrylate and glycidyl methacrylate (Ter-CE37B) | 5% sodium hydrogen N-(1-oxododecyl)-L-glutamate | Barrel Temp: 260° C. L/D ratio: 41 Screw Diameter: 35 mm Screw Speed: 150 rpm | 1.7 | 99% |
| 10a | 93% Tritan (Eastman ® TX 2001) | 2% terpolymer of ethylene, methyl methacrylate and glycidyl methacrylate (Ter-CE37B) | 5% Sodium lauroyl sarcosinate | Barrel Temp: 260° C. L/D ratio: 41 Screw Diameter: 35 mm Screw Speed: 150 rpm | 2.0 | 99% |

For the comparative embodiments, several similar formulations were performed with maleic anhydride-based linker or without linker. The composition of the comparative formulation is summarized in table below. The composition was melt blended via a twin-screw extruder to enable the reaction between linker and non-fouling agents. The typical processing temperature is 200° C., with a L/D ratio of the screw is at least 41, while for PC and Tritan, the processing temperature is increased to 270° C. The composition after melt processing is then pelletized into granule shape, and then molded into a standard specimen (L×W×D=50 mm×50 mm×1 mm) for further testing. The aging of samples was performed by immersing the samples into a PP based container filled with water at 80% capacity. The sample with container was then put into a microwave oven under 1,000 W for 3 mins, 10 cycles. The samples are then tested for germ-repellant test according to the FIGURE.

TABLE 3

Comparative polymer composites.

|  | Base Polymer | Reactive Linker | Non-Fouling Agent | Processing Condition | Yellowness Index (ASTM E313) | Germ-Repellant Rate after Aging |
|---|---|---|---|---|---|---|
| 1b | 95% Polypropylene (Clyrell ® RC5056) | 2% PP-MA (Clariant Licocene 7452) | 3% Ceteareth-20 (BASF ® Eumulgin B2) | Barrel Temp: 200° C. L/D ratio: 41 Screw Diameter: 35 mm Screw Speed: 150 rpm | 4.5 | 97% |
| 1c | 97% Polypropylene (Clyrell ® RC5056) | N/A | 3% Ceteareth-20 (BASF ® Eumulgin B2) | Barrel Temp: 200° C. L/D ratio: 41 Screw Diameter: 35 mm Screw Speed: 150 rpm | 1.8 | 0% |
| 2b | 97% High density polyethylene (Exxonmobil ® HMA-016) | 1% EVA-MA (Lotader 3210) | 2% Ceteareth-20 (BASF ® Eumulgin B2) | Barrel Temp: 190° C. L/D ratio: 41 Screw Diameter: 35 mm Screw Speed: 150 rpm | 3.5 | 97% |

TABLE 3-continued

Comparative polymer composites.

| | Base Polymer | Reactive Linker | Non-Fouling Agent | Processing Condition | Yellowness Index (ASTM E313) | Germ-Repellant Rate after Aging |
|---|---|---|---|---|---|---|
| 2c | 98% High density polyethylene (Exxonmobil ® HMA-016) | N/A | 2% Ceteareth-20 (BASF ® Eumulgin B2) | Barrel Temp: 190° C. L/D ratio: 41 Screw Diameter: 35 mm Screw Speed: 150 rpm | 1.1 | 0% |
| 3b | 97% Thermoplastic polyurethane (Covestro ® RxT85) | 1% SMA (Ter-SMA) | 2% Ceteareth-20 (BASF ® Eumulgin B2) | Barrel Temp: 200° C. L/D ratio: 41 Screw Diameter: 35 mm Screw Speed: 150 rpm | 4.2 | 98% |
| 3c | 98% Thermoplastic polyurethane (Covestro RxT85) | N/A | 2% Ceteareth-20 (BASF Eumulgin B2) | Barrel Temp: 200° C. L/D ratio: 41 Screw Diameter: 35 mm Screw Speed: 150 rpm | 1.4 | 0% |
| 4b | 94% Acrylonitrile butadiene styrene (Chimei ® PA-757) | 1% SMA (Ter-SMA) | 5% PEG-SHO (Croda Atlas ® G-1096) | Barrel Temp: 200° C. L/D ratio: 41 Screw Diameter: 35 mm Screw Speed: 150 rpm | 14 | 85% |
| 4c | 95% Acrylonitrile butadiene styrene (Chimei ® PA-757) | N/A | 5% PEG-SHO (Croda Atlas ® G-1096) | Barrel Temp: 200° C. L/D ratio: 41 Screw Diameter: 35 mm Screw Speed: 150 rpm | 10 | 50% |
| 5b | 97% SEBS (ELASTRON F.G100.A60.N) | 1% SMA (Ter-SMA) | 2% Ceteareth-20 (BASF Eumulgin B2) | Barrel Temp: 200° C. L/D ratio: 413.5 Screw Diameter: 35mm Screw Speed: 150 rpm | 6 | 90% |
| 5c | 98% Styrene-ethylene-butylene-styrene (ELASTRON ® F.G100.A60.N) | N/A | 2% Ceteareth-20 (BASF ® Eumulgin B2) | Barrel Temp: 200° C. L/D ratio: 41 Screw Diameter: 35 mm Screw Speed: 150 rpm | 3.5 | 40% |
| 6b | 96% Thermoplastic vulcanizate (Exxonmobil ® Santoprene ® 8271-55) | 2% PP-MA (Licocene 7452) | 2% Ceteareth-20 (BASF Eumulgin B2) | Barrel Temp: 200° C. L/D ratio: 41 Screw Diameter: 35 mm Screw Speed: 150 rpm | 9 | 95% |
| 6c | 98% Thermoplastic vulcanizate (Exxonmobil Santoprene ® 8271-55) | N/A | 2% Ceteareth-20 (BASF Eumulgin B2) | Barrel Temp: 200° C. L/D ratio: 41 Screw Diameter: 35 mm Screw Speed: 150 rpm | 6 | 45% |
| 7b | 93% Polycarbonate (Covestro Makrolon ® 2407) | 2% SMA (Ter-SMA) | 5% PEG-40 hydrogenated castor oil (BASF Eumulgin CO-40) | Barrel Temp: 270° C. L/D ratio: 41 Screw Diameter: 35 mm Screw Speed: 150 rpm | 5.2 | 72% |

TABLE 3-continued

Comparative polymer composites.

| | Base Polymer | Reactive Linker | Non-Fouling Agent | Processing Condition | Yellowness Index (ASTM E313) | Germ-Repellant Rate after Aging |
|---|---|---|---|---|---|---|
| 7c | 95% Polycarbonate (Covestro Makrolon ® 2407) | N/A | 5% PEG-40 hydrogenated castor oil (BASF Eumulgin CO-40) | Barrel Temp: 270° C. L/D ratio: 41 Screw Diameter: 35 mm Screw Speed: 150 rpm | 1.5 | 50% |
| 8b | 94% Acrylonitrile butadiene styrene (Chimei PA-757) | 1% SMA (Ter-SMA) | 5% Cocamidopropyl betaine | Barrel Temp: 200° C. L/D ratio: 41 Screw Diameter: 35 mm Screw Speed: 150 rpm | 14 | 96% |
| 8c | 94% Acrylonitrile butadiene styrene (Chimei PA-757) | N/A | 5% Cocamidopropyl betaine | Barrel Temp: 200° C. L/D ratio: 41 Screw Diameter: 35 mm Screw Speed: 150 rpm | 10 | 0% |
| 9b | 93% Polycarbonate (Covestro PC 2407) | 2% SMA (Ter-SMA) | 5% sodium hydrogen N-(1-oxododecyl)-L-glutamate 1.7 | Barrel Temp: 260° C. L/D ratio: 41 Screw Diameter: 35mm Screw Speed: 150 rpm | 4.0 | 97% |
| 9c | 95% Polycarbonate (Covestro PC 2407) | N/A | 5% sodium hydrogen N-(1-oxododecyl)-L-glutamate | Barrel Temp: 260° C. L/D ratio: 41 Screw Diameter: 35 mm Screw Speed: 150 rpm | 1.9 | 80% |
| 10b | 93% Tritan ® (Eastman ® TX 2001) | 2% SMA (Ter-SMA) | 5% Sodium lauroyl sarcosinate | Barrel Temp: 260° C. L/D ratio: 41 Screw Diameter: 35 mm Screw Speed: 150 rpm | 4.5 | 98% |
| 10c | 93% Tritan ® (Eastman ® TX 2001) | N/A | 5% Sodium lauroyl sarcosinate | Barrel Temp: 260° C. L/D ratio: 41 Screw Diameter: 35 mm Screw Speed: 150 rpm | 2.0 | 0% |

What is claimed is:

1. A bacteria repellant polymer composite comprising a base polymer and a bacteria repellant conjugate formed by the reaction of an epoxy resin and a bacteria repellant agent, wherein the bacteria repellant agent is a non-ionic surfactant or an ionic surfactant.

2. The bacteria repellant polymer composite of claim 1, wherein a 1 mm thick sample of the bacteria repellant polymer composite has a yellowness index of 3.5 or less according to ASTM E313.

3. The bacteria repellant polymer composite of claim 1, wherein the base polymer is selected from the group consisting of polyolefins, cyclic polyolefins, polyacrylics, polyacetates, polystyrenics, polyesters, polyimides, polyaryletherketones, polycarbonates, polyurethanes, polyacrylonitrile, polyvinylchlorides, polysulfone, polyamide, and thermoplastic elastomers, copolymers thereof, and blends thereof.

4. The bacteria repellant polymer composite of claim 1, wherein the base polymer is polypropylene, polyethylene, thermoplastic polyurethane, thermoplastic vulcanizate, styrene ethylene butylene styrene block thermoplastic elastomer, polycarbonate, and acrylonitrile butadiene styrene.

5. The bacteria repellant polymer composite of claim 1, wherein the bacteria repellant agent is selected from the group consisting of fatty alcohol polyoxyalkylene ethers, polyoxyalkylene fatty acid esters, polyoxyalkylene sorbitan fatty acid esters, sorbitol fatty acid esters, polyether glycols, polyoxyethylene sorbitol hexaoleate, polyoxyethylene sorbitan monolaurate, polyoxyethylene sorbitan monooleate, polyoxyethylene hydrogenated castor oil polyoxyethylene cetyl ether, polyoxyethylene stearyl ether, cocamidopropyl betaine, sodium hydrogen N-(1-oxododecyl)-L-glutamate, sodium lauroyl sarcosinate, sodium stearoyl glutamate, and 3-[(3-cholamidopropyl)dimethylammonio]-1-propanesulfonate.

6. The bacteria repellant polymer composite of claim 1, wherein the bacteria repellant agent is a polyethylene glycol ether of cetearyl alcohol, poly(ethylene glycol) sorbitol hexaoleate, cocamidopropyl betaine, N-(1-oxododecyl)-glutamate, sodium lauroyl sarcosinate, or a mixture thereof.

7. The bacteria repellant polymer composite of claim 1, wherein the epoxy resin is a novolac epoxy resin, poly (glycidyl methacrylate), poly(glycidyl acrylate), a terpolymer of ethylene, methyl methacrylate and glycidyl methacrylate, a terpolymer of ethylene, acrylic ester, and glycidyl methacrylate, epoxy functionalized polybutudiene, or epoxy functionalized poly(butadiene-co-polystyrene); or the epoxy resin is selected from the group consisting of:

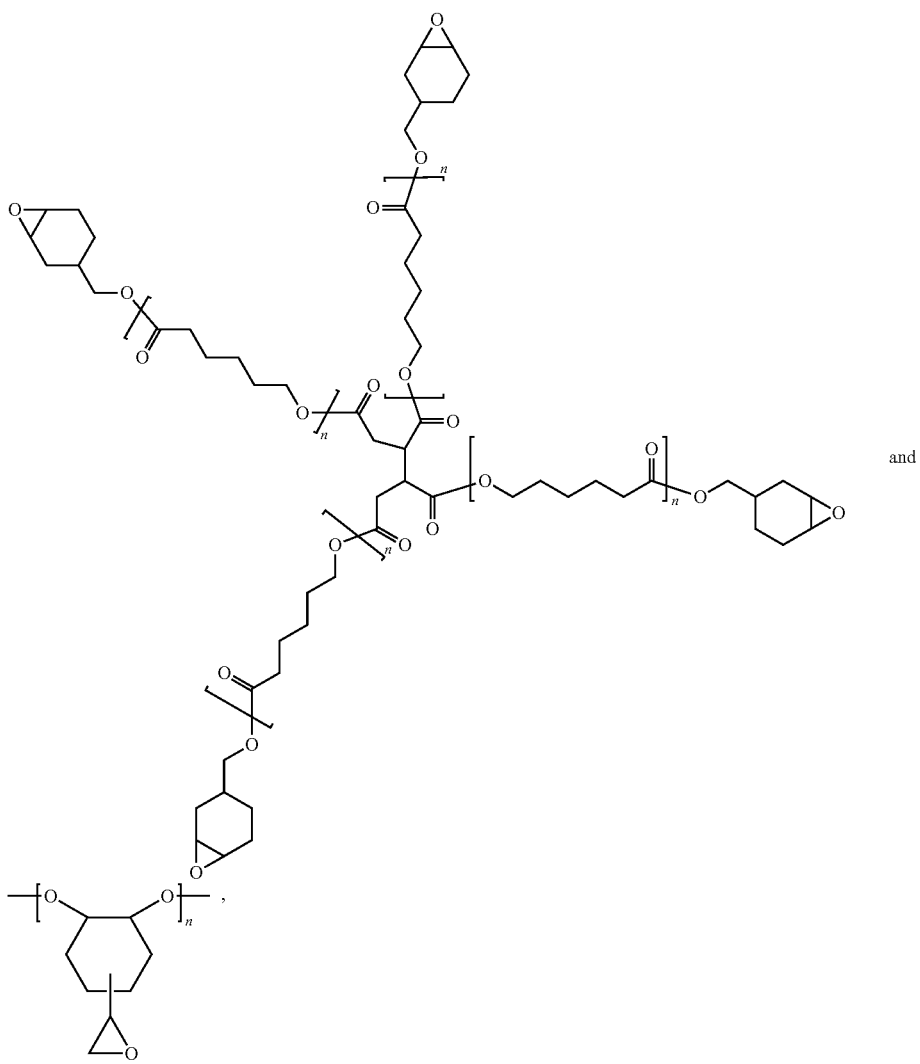

and wherein n for each instance is independently 1-10,000.

8. The bacteria repellant polymer composite of claim 1, wherein the epoxy resin is a novolac epoxy resin, poly(glycidyl methacrylate), a terpolymer of ethylene, acrylic ester, and glycidyl methacrylate, epoxy functionalized polybutadiene, or epoxy functionalized poly(butadiene-co-polystyrene).

9. The bacteria repellant polymer composite of claim 1, wherein the bacteria repellant agent is a polyethylene glycol ether of cetearyl alcohol, poly(ethylene glycol) sorbitol hexaoleate, cocamidopropyl betaine, N-(1-oxododecyl)-glutamate, sodium lauroyl sarcosinate or a mixture thereof; and the epoxy resin is a novolac epoxy resin, poly(glycidyl methacrylate), a terpolymer of ethylene, acrylic ester, glycidyl methacrylate, epoxy functionalized polybutadiene, or an epoxy functionalized poly(butadiene-co-polystyrene).

10. The bacteria repellant polymer composite of claim 9, wherein a 1 mm thick sample of the bacteria repellant polymer composite has a yellowness index of 2.1 or less according to ASTM E313.

11. The bacteria repellant polymer composite of claim 1, wherein the base polymer and the bacteria repellant conjugate are present in the bacteria repellant polymer composite in a mass ratio of 92:8 to 98:2, respectively.

12. The bacteria repellant polymer composite of claim 1, wherein the based polymer is selected from the group consisting of polypropylene, polyethylene, thermoplastic polyurethane, thermoplastic vulcanizate, styrene ethylene butylene styrene block thermoplastic elastomer, polycarbonate, and acrylonitrile butadiene styrene; the bacteria repellant agent is a polyethylene glycol ether of cetearyl alcohol, poly(ethylene glycol) sorbitol hexaoleate, cocamidopropyl betaine, N-(1-oxododecyl)-glutamate, sodium lauroyl sarcosinate or a mixture thereof; the epoxy resin is a novolac epoxy resin, poly(glycidyl methacrylate), a terpolymer of ethylene, acrylic ester, and glycidyl methacrylate, epoxy functionalized polybutadiene, or an epoxy functionalized poly(butadiene-co-polystyrene); and a 1 mm thick sample of the bacteria repellant polymer composite has a yellowness index between 1.1 to 2.1 according to ASTM E313.

13. A method of preparing the bacteria repellant polymer composite of claim 1, the method comprising: combining a base polymer, an epoxy resin, and a bacteria repellant agent thereby forming a mixture; and melt processing the mixture under conditions that facilitate the reaction of at least a portion of the epoxy resin and at least a portion of the bacteria repellant agent thereby forming the bacteria repellant polymer composite.

14. The method of claim 13, wherein the base polymer is polypropylene, polyethylene, thermoplastic polyurethane, thermoplastic vulcanizate, styrene ethylene butylene styrene block thermoplastic elastomer, polycarbonate, and acrylonitrile butadiene styrene.

15. The method of claim 13, wherein the bacteria repellant agent is a polyethylene glycol ether of cetearyl alcohol, poly(ethylene glycol) sorbitol hexaoleate, cocamidopropyl betaine, N-(1-oxododecyl)-glutamate, sodium lauroyl sarcosinate, or a mixture thereof.

16. The method of claim 13, wherein the epoxy resin is a novolac epoxy resin, poly(glycidyl methacrylate), a terpolymer of ethylene, acrylic ester, and glycidyl methacrylate, epoxy functionalized polybutadiene, or epoxy functionalized poly(butadiene-co-polystyrene).

17. The method of claim 13, wherein the base polymer, the epoxy resin, and the bacteria repellant agent are combined in a mass ratio between 91:3:6 to 98:0.1:1.9, respectively.

18. The method of claim 13, wherein the mixture is melt processed at a temperature between 180° C. to 270° C.

19. The method of claim 13, wherein the base polymer is selected from the group consisting of polypropylene, polyethylene, thermoplastic polyurethane, thermoplastic vulcanizate, styrene ethylene butylene styrene block thermoplastic elastomer, polycarbonate, and acrylonitrile butadiene styrene; the bacteria repellant agent is a polyethylene glycol ether of cetearyl alcohol, poly(ethylene glycol) sorbitol hexaoleate, cocamidopropyl betaine, N-(1-oxododecyl)-glutamate, sodium lauroyl sarcosinate or a mixture thereof; the epoxy resin is a novolac epoxy resin, methaerylate), a terpolymer of ethylene, acrylic ester, and glycidyl methacrylate, epoxy functionalized polybutadiene, or an epoxy functionalized poly(butadiene-co-polystyrene); the mixture is melt processed at a temperature between 190° C. to 270° C.; and the base polymer, the epoxy resin, and the bacteria repellant agent are combined in a mass ratio between 93:2:5 to 96.8:0.2:3, respectively.

20. A bacteria repellant composite prepared in accordance with the method of claim 19.

* * * * *